UNITED STATES PATENT OFFICE.

ALBERT HEINEMANN, OF BERLIN-WILMERSDORF, GERMANY.

PROCESS FOR PRODUCING A SUBSTITUTE FOR RAW COFFEE-BEANS.

1,400,161. Specification of Letters Patent. Patented Dec. 13, 1921.

No Drawing. Application filed July 22, 1921. Serial No. 486,853.

*To all whom it may concern:*

Be it known that I, ALBERT HEINEMANN, a citizen of the German Republic, residing at Berlin-Wilmersdorf, Germany, have invented certain new and useful Improvements in a Process for Producing a Substitute for Raw Coffee-Beans, (for which I have filed applications in Germany Sept. 18, 1917, and Feb. 4, 1921,) of which the following is a specification.

The invention relates to the production of a new article of commerce similar to raw unroasted coffee-beans from barley. It is already known to employ barley as a substitute for coffee. The barley is for this purpose hulled and roasted. The so-called barley-coffee is always put on the market in the roasted, and as a rule, in the ground state. This has the great drawback that the coffee-like flavor of the barley soon volatilizes so that the drink prepared from it is insipid and tasteless. The same drawback also occurs in ground coffee, although after a longer time. Coffee roasters on a large scale for this reason usually only roast the quantity sufficient for their daily requirements, in order to avoid the storing of the roasted coffee. A product made from barley and so prepared that it is almost equivalent to raw coffee and which is treated as such and sold in the open market, is unknown up to the present.

According to the improved process forming the object of this invention the barley is hulled and then is saturated with an infusion of hop flowers, which has a bitter taste, as well known. Preferably the hulled barley is steeped in a watery infusion of the hop flowers and after swelling dried down to approximately the original precentage of water, in order to enable it to be stored.

It has already been proposed to subject hulled barley to a treatment which would enable it to be used as a substitute for coffee by allowing hot water or steam to act on the preferably crushed barley corn. Hereby a large portion of the corn is lost, so that this process is not economical. Grain in the unhulled state has also already been impregnated with watery solutions of bitter plants, but this process cannot be recommended, because the liquid penetrates only with difficulty into the interior of the kernel and insoluble parts in suspension, which are mainly the carriers of the flavor, are detained by the outer layers of the hull which act in the manner of filters.

The invention does not reside in the employment of hulled barley as a substitute for coffee or in the steeping of barley in an infusion of bitter plants in itself, but in the combination of these steps and the subsequent drying with the object of obtaining a new article of commerce equivalent to coffee beans and to be marketed in the same manner, so that it may be roasted in quantities sufficient for the daily requirement.

The new article of commerce may also be considerably improved by subjecting the barley previous to the impregnation with the bitter substances to a short and incomplete germination process in the steeping tank, upon the floor or in the germination cylinder and the driving off the water taken up and the larger portion of the original contents of water by drying and then removing the impeding acting hulls.

In consequence of the steeping for germination purposes the water penetrates into the starchy particles of the inner barley corn and owing to the diastase produced during the germination a decomposition and partial conversion of the starch takes place. This process is similar to the process for the production of malt. After the germination has been finished the grain is dried again and the contents of water is reduced to about 5% and the grain is then hulled. Owing to this preliminary treatment the grain is rendered extremely receptive for watery solutions or the impregnating liquids consisting of infusions of bitter vegetable substances. The time required for steeping varies according to the condition of the barley. For mild and mealy barley the time is shorter (about 24 hours), while for hard and fatty barley the time required is up to about 48 hours. The time for steeping may be shortened by heating the steeping liquid. The liquid is then allowed to run off and the remaining barley is conveyed into a drying cylinder and there treated with hot air.

It will be obvious that the process may be varied within the ambit of the claims without departing from the spirit of the invention or sacrificing any of its advantages.

What I claim as my invention and desire to secure by Letters Patent is:

1. The process for producing from barley a substitute for coffee in the form of an article of commerce corresponding with raw coffee beans, which consists in hulling the grain, steeping it in an infusion of hop flowers until it swells up and then drying it until the contents of water agrees approximately with that of the natural grain.

2. The process for producing from barley a substitute for coffee in the form of an article of commerce corresponding with raw coffee beans, which consists in subjecting the grain to an incomplete germination process, drying and hulling it, steeping it in an infusion of hop flowers until it swells up and then drying it until the contents of water agrees approximately with that of the natural grain.

In testimony whereof I affix my signature in presence of two witnesses.

ALBERT HEINEMANN.

Witnesses:
 GEORGE RIEBIG,
 SIEGFRIED HAMBURGER.